United States Patent [19]

Nazmy

[11] Patent Number: 5,064,734
[45] Date of Patent: Nov. 12, 1991

[54] CURRENT-TRANSMITTING COMPONENTS FOR STACKED HIGH-TEMPERATURE FUEL CELLS AND METHOD OF PRODUCING THEM

[75] Inventor: Mohamed Nazmy, Fislisbach, Switzerland

[73] Assignee: Asea Brown Boveri Ltd., Baden, Switzerland

[21] Appl. No.: 596,035

[22] Filed: Oct. 11, 1990

[30] Foreign Application Priority Data

Oct. 27, 1989 [CH] Switzerland .................... 3877/89

[51] Int. Cl.$^5$ .................................... H01M 8/12
[52] U.S. Cl. .................................... 429/33; 429/38; 429/44; 427/115; 29/623.5
[58] Field of Search ............... 429/34, 38, 39, 33, 429/44, 45, 40; 427/115, 428, 429, 430.1; 29/623.5

[56] References Cited

U.S. PATENT DOCUMENTS

| 3,300,344 | 1/1967 | Bray et al. |
| 3,516,865 | 6/1970 | Tedmon et al. |
| 4,395,468 | 7/1983 | Isenberg ........................... 429/31 |
| 4,692,274 | 9/1987 | Isenberg et al. ................. 429/34 X |

FOREIGN PATENT DOCUMENTS

| 338823 | 10/1989 | European Pat. Off. |
| 8606762 | 11/1986 | World Int. Prop. O. |

OTHER PUBLICATIONS

"High-Temperature Fuel Battery Containing Ceramic Electrolytes", Brown Boveri Mitteilungen, Jan./Feb. 1966, pp. 21-30, O. Antonsen et al.

"An Overview of the Westinghouse Electric Corporation Solid Oxide Fuel Cell Program", Extended Abstracts, Fuel Cell Technology and Applications, International Seminar, The Hague, Holland, Oct. 26 to 29, 1987, W. J. Dollard et al., pp. 262-273.

Solid Electrolytes, "High-Temperature Fuel Cells", 1978, published by Academic Press Inc., pp. 431 ff, F. J. Rohr.

"Monolithic Fuel Cell Development", Argonne National Laboratory, Paper presented at the 1986 Fuel Cell Seminar, Oct. 26-29, 1986, Tucson, Ariz., U.S. Department of Energy, The University of Chicago, D. C. Fee et al.

*Primary Examiner*—Anthony Skapars
*Attorney, Agent, or Firm*—Oblon, Spivak, McClelland, Maier & Neustadt

[57] ABSTRACT

Current-transmitting components for conducting current between adjacent, planar, stacked high-temperature fuel cells containing solid electrolyte (1) comprising a carrier (7; 10) which determines the geometrical shape and is composed of an oxide-dispersion-hardened nickel or nickel/chromium alloy containing up to 2% by weight of $ThO_2$ as dispersoid, an electrically conductive $Cr_2O_3$ layer (8) and a noble-metal surface layer (9; 12) supported on the latter at the contact/touching faces. Variants having continuous (13; 14) or porous (9; 12) noble-metal surface layer composed of Au, a Pt metal or alloys. Separating plate (4) composed of an oxide-dispersion-hardened nickel/chromium alloy with nickel plating (5) on the fuel side and noble-metal plating (6) on the oxygen side.

7 Claims, 2 Drawing Sheets

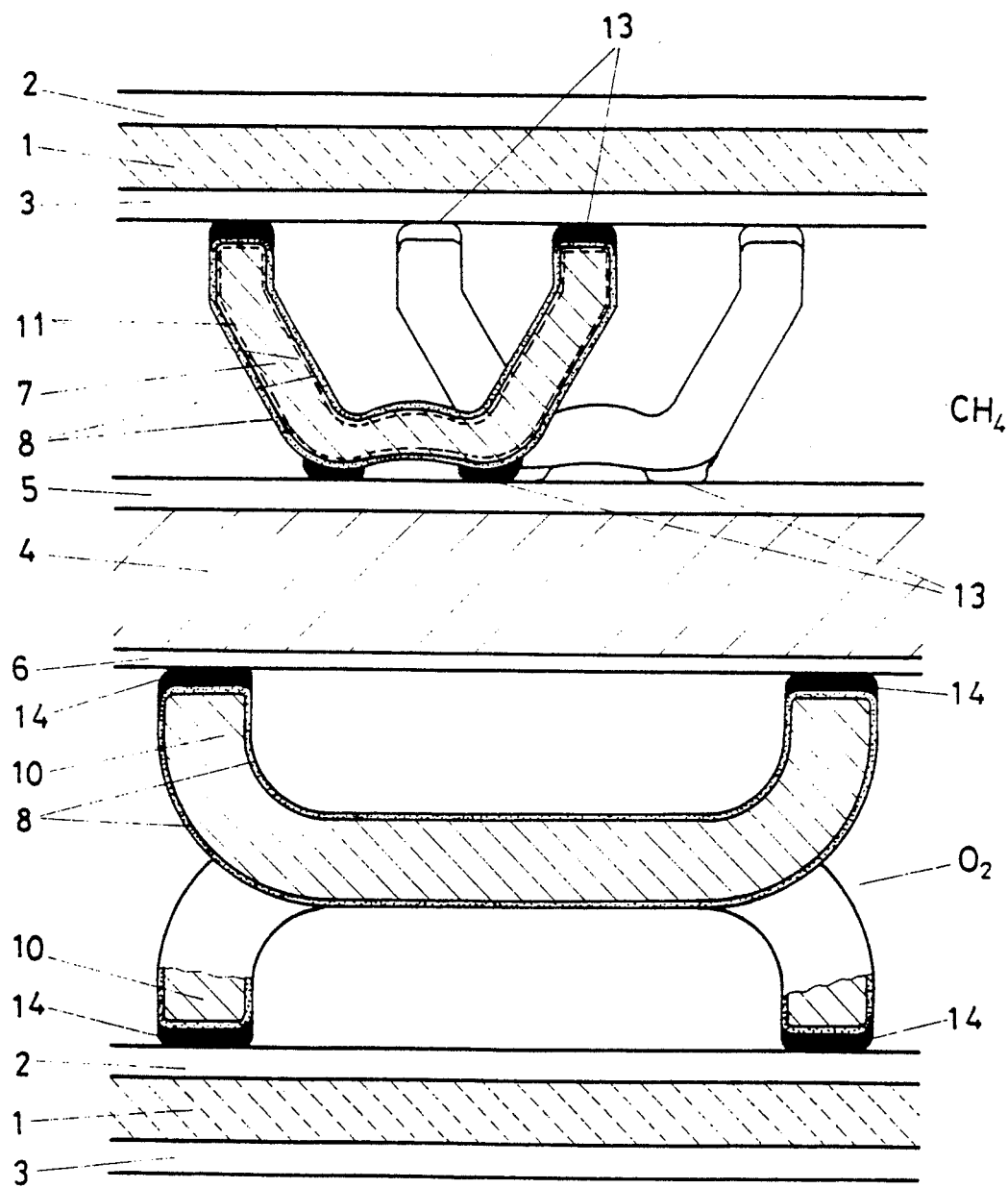

CURRENT-TRANSMITTING COMPONENTS FOR STACKED HIGH-TEMPERATURE FUEL CELLS AND METHOD OF PRODUCING THEM

BACKGROUND OF THE INVENTION

1. Field of the Invention

High-temperature fuel cells for converting chemical energy into electrical energy. Due to their good efficiency compared with other types of conversion, the electrochemical conversion of energy and the apparatuses required for the purpose are gaining in importance.

The invention relates to the further development of electrochemical high-temperature cells using ceramic solid electrolytes as ion conductors, the cells being required to be substantially independent of the fuel used and to provide a space-saving arrangement.

In a narrower context, it relates to current-transmitting components for conducting current between adjacent shallow, planar, stacked ceramic high-temperature fuel cells containing solid electrolyte based on doped stabilized zirconium oxide, the oxygen electrode of one fuel cell being electrically conductively connected in each case to the fuel electrode of the subsequent fuel cell and the gap between the electrodes being subdivided by a gas-impervious electrically conducting separating plate into two chambers conducting the different gaseous media comprising fuel ($CH_4$) and oxygen ($O_2$) carrier.

The invention furthermore relates to a method of producing the current-transmitting components.

2. Discussion of Background

High-temperature fuel cells containing ceramic solid electrolyte are known from numerous publications. The actual components for such cells may have a very wide variety of shapes and dimensions. In order to keep the ohmic voltage losses low, attempts are being made everywhere to keep the thickness of the electrolyte layer as low as possible. The shape and dimensions of the components depend, in addition, on the requirement for the possibility of electrically connecting a plurality of cells in series in order to obtain the terminal voltage needed and to keep the currents comparatively low.

In the case of a stacked arrangement of a plurality of plate-like planar fuel cells resembling the filter press principle, the current has to be conducted perpendicularly to the plane of the plates from the oxygen electrode of one cell to the fuel electrode of the subsequent cell. Electrical connecting links to the electrodes (current collectors) and separating plates (bipolar plates) are necessary for this function as essential components.

The components hitherto known frequently do not meet the modern requirements in relation to the materials used, the design and fabrication, and also the long-term behavior.

The known basic components used for fuel cells are generally distinguished by a comparatively complicated geometry which makes it difficult to construct compact space-saving systems. In particular, a usable configuration which can be achieved with simple fabrication means is lacking for an optimum series connection of the individual cells.

There is therefore a considerable need for further development, simplification and rationalization of the structure and the production of current-carrying basic components and their optimum mutual arrangement, based on ceramic high-temperature fuel cells.

The following documents are cited in relation to the prior art:

O. Antonsen, W. Baukal and W. Fischer, "Hochtemperatur-Brennstoffbatterie mit keramischem Electrolyten" ("High-temperature fuel battery containing ceramic electrolytes"), Brown Boveri Mitteilungen, January/February 1966, pages 21–30, U.S. Pat. No. 4,692,274

U.S. Pat. No. 4,395,468

W. J. Dollard and W. G. Parker, "An overview of the Westinghouse Electric Corporation solid oxide fuel cell program", Extended Abstracts, Fuel Cell Technology and Applications, International Seminar, The Hague, Holland, 26 to 29 Oct. 1987, F. J. Rohr, High-Temperature Fuel Cells, Solid Electrolytes, 1978, published by Academic Press Inc., pages 431 ff, D. C. Fee et al., Monolithic fuel Cell Development, Argonne National Laboratory, Paper presented at the 1986 Fuel Cell Seminar, Oct. 26–29, 1986 Tucson, Ariz., U.S. Department of Energy, The University of Chicago.

SUMMARY OF THE INVENTION

Accordingly, one object of this invention is to provide novel current-transmitting components for conducting current between adjacent planar, stacked ceramic fuel cells and also a method for producing them, it being required, on the one hand, to ensure a good electrical contact both to the electrodes of the fuel cell and to the other components at temperatures up to 900° C. and, on the other hand, to achieve a high metallic electrical conductivity. The components must be capable of being used both in reducing, neutral and in oxidizing atmosphere without adverse changes due to material transfers such as diffusion or other migration processes or material losses due to evaporation etc. and have a high long-term stability. The components should be capable of being produced cheaply, reproducibly and replaceably.

This object is achieved by the current-transmitting components mentioned in the preamble having that shape and design wherein a separating plate composed of an oxide-dispersion-hardened nickel/chromium alloy carrying a nickel plating on the fuel side and a noble-metal plating on the oxygen side is provided, wherein, furthermore, current collectors are provided both on the fuel side and on the oxygen side, each current collector comprising a carrier which determines the geometrical shape and is composed of electrically conducting oxide-dispersion-hardened nickel or nickel/chromium alloy having a high Cr content at least in the surface zones, $ThO_2$ being present as dispersoid in a content of up to 2% by weight, furthermore of a porous or impervious noble-metal surface layer which is present only at the contact/touching faces and is made of Au or a Pt metal or an alloy of at least two of said metals, and of a continuous layer which is present between carrier and noble-metal surface layer and is made of electrically conductive $Cr_2O_3$ which simultaneously acts as an oxidation protection and as a diffusion barrier.

The object is furthermore achieved by a method of producing a current-transmitting component which comprises first manufacturing a carrier from the oxide-dispersion-hardened nickel or nickel/chromium alloy by thermo-mechanical treatment and/or mechanical machining from suitable fine-grained input material/semi-finished product in the form of sheet, strip or wire and recrystallizing it under protective gas or vacuum at 1,250° to 1,320° C. for ½ h to 3 h to produce a heat-resistant coarse-grained structure and, if nickel is used, electrochemically providing it with an intermediate Cr layer 0.5 to 10 μm thick, roasting it in oxygen atmosphere at 800° to 900° C. for 1 to 24 h to form a continuous layer of electrically conductive $Cr_2O_3$, and which comprises providing the carrier coated in this way with a noble-metal surface layer at the contact/touching faces to the electrodes and to the separating plate.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 shows a diagrammatic section/elevation through a separating plate with current collectors arranged on both sides in contact-finger form and associated, adjacent, parallel planar fuel cells.

DESCRIPTION OF THE PREFERRED EMBODIMENTS

Figure 1:
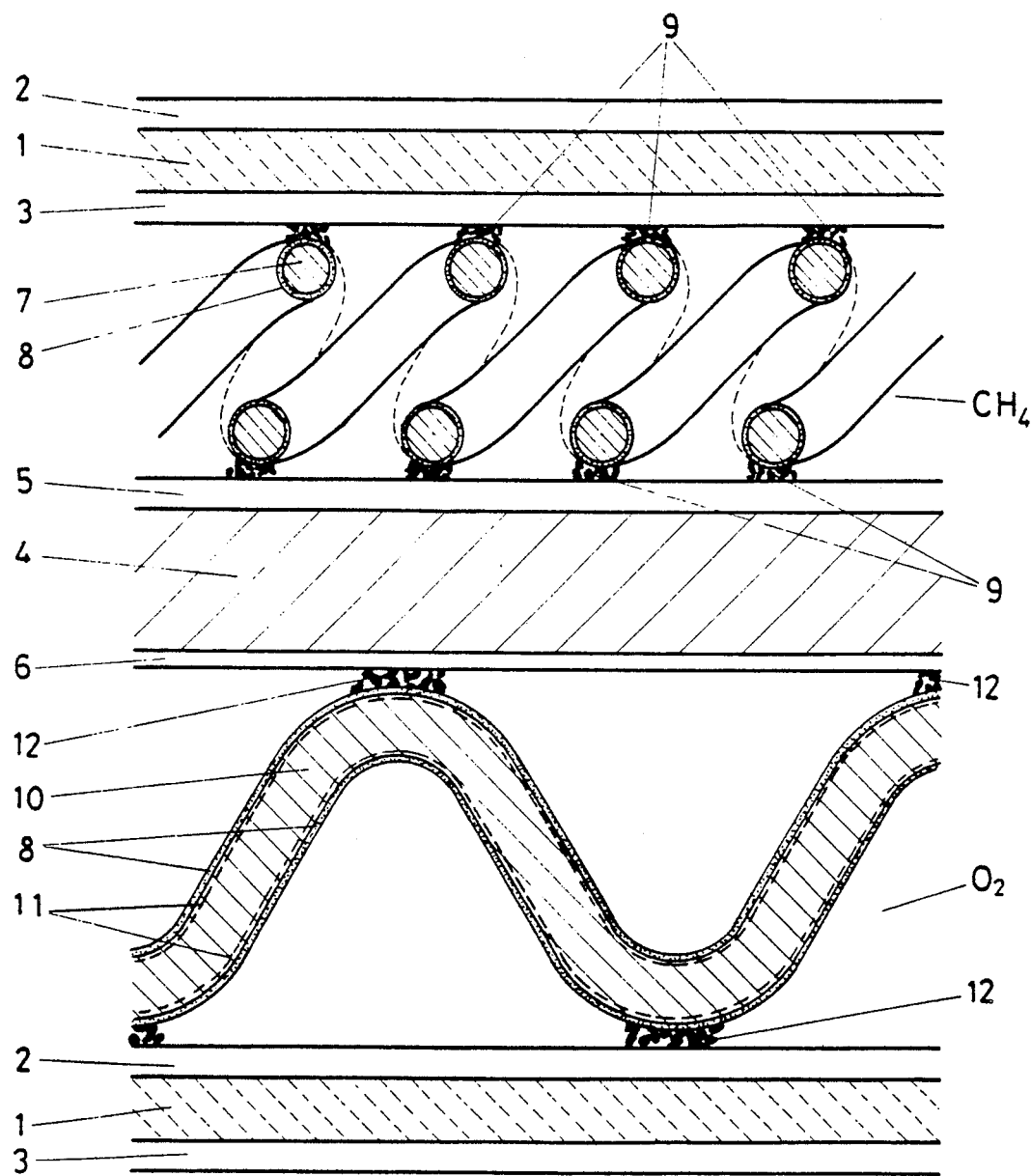
FIG. 1 shows a diagrammatic section/elevation through a separating plate with current collectors arranged on both sides in helical and wave form and associated, adjacent, parallel, planar fuel cells.

Referring now to the drawings, wherein like reference numerals designate identical or corresponding parts throughout the several views, FIG. 1 shows a diagrammatic section/elevation through a separating plate with current collectors arranged on both sides in helical and wave form and associated, adjacent, parallel planar fuel cells. The high-temperature fuel cell per se comprises the ceramic solid electrolyte 1 composed of doped stabilized $ZrO_2$ and the porous positive oxygen electrode 2 composed of La/Mn perovskite and also the porous negative fuel electrode 3 composed of Ni/$ZrO_2$ cermet. 4 is a gas-impervious, electrically conducting separating plate composed of a heat-resistant alloy. The separating plate 4 carries, on the fuel side, a nickel plating 5 as a surface layer ensuring a good electrical contact, in particular for sliding contact with the fuel-side current collector. 6 is a comparatively thin noble-metal plating on the oxygen side of the separating plate 4. This is preferably composed of Au or a Pt metal or an alloy of said noble metals. 7 is the carrier (main body) of the current collector on the fuel side which, in this case, has the form of a transversely compressed, oblique-angled helix. The carrier 7 is composed of an oxide-dispersion-hardened nickel (TD-Ni) or of an oxide-dispersion-hardened NiCr alloy (TD-NiCr). 8 is a continuous layer composed of electrically conductive $Cr_2O_3$. 9 is a porous noble-metal surface layer at the contact/touching faces of the current collector of the fuel side. 10 is the carrier (main body) of the current collector on the oxygen side. In this case, it has the form of a sinusoidally corrugated strip. The carrier 10 is composed of an oxide-dispersion-hardened Ni/Cr alloy (TD-NiCr). 11 is a Cr intermediate layer present between the carrier 10 and the layer composed of $Cr_2O_3$. 12 is a porous noble-metal surface layer at the contact/touching faces of the current collector. The symbol $CH_4$ stands generally for the chamber of the fuel cell flooded with gaseous fuel and the symbol $O_2$ for the chamber of the fuel cell flooded with gaseous oxygen carrier (air). The thicknesses are drawn in considerably exaggerated form compared with the longitudinal dimensions.

FIG. 2 relates to a diagrammatic section/elevation through a separating plate with current collectors, arranged on both sides, in contact-finger form and associated, adjacent, parallel planar fuel cells. The reference numerals 1, 2, 3 of the actual fuel cell correspond precisely to those of FIG. 1. The electrically conducting separating plate 4 provided with a nickel plating 5 on the fuel side and with a noble-metal plating 6 on the oxygen side likewise corresponds in principle to those of FIG. 1. The carrier (main body) 7 of the current collector on the fuel side has in this case the shape of comb-like, mutually offset contact fingers. The carrier 7 has a Cr intermediate layer 11 and also a continuous layer 8, situated thereon, of electrically conductive $Cr_2O_3$. At the contact/touching faces to the fuel electrode 3 (head side), on the one hand, and at those to the separating plate 4 (base side), on the other hand, the carrier 7 is provided with a continuous, more or less impervious noble-metal surface layer 13. The carrier (main body) 10 of the current collector on the oxygen side has in this case the form of a sheet alternately bent to the side of the electrode and the side of the separating plate and having corresponding projecting contact-finger-like lugs. The carrier 10 is provided in the region of the ends of the said lugs at the contact/touching faces to the oxygen electrode 3 and to the separating plate 4 with a continuous, more or less impervious noble-metal surface layer 14.

Exemplary embodiment 1:
See FIG. 1.
An arrangement of current-transmitting components was built up from the following individual parts:
Current collector, fuel side
Separating plate
Current collector, oxygen side The actual fuel cell was composed of a shallow, planar plate with the centrally arranged solid electrolyte 1 composed of stabilized $ZrO_2$, a sintered-on porous oxygen electrode 2 composed of La/Mn perovskite and a likewise sintered-on porous fuel electrode 3 composed of a Ni/$ZrO_2$ cermet.

The carrier (main body) 7 of the fuel-side current collector was composed of a comparatively loose wire helix whose windings were slightly oblique with respect to the longitudinal axis. The dimensions were as follows:
Wire diameter = 0.25 mm
Winding diameter = 1.2 mm
Pitch = 0.8 mm
Oblique position of the winding with respect to normal plane approx. 35°.

The material chosen for the carrier 7 of the fuel-side current collector was an oxide-dispersion-hardened Ni/Cr alloy with the trade name TD-NiCr. The composition was as follows:
Cr = 20% by weight
$ThO_2$ = 2.0% by weight
Ni = remainder The starting material was composed of an extruded fine-grained rod which was first brought by hot rolling at approximately 1,000° C. to a smaller diameter and gradually by drawing with intermediate annealing to the final diameter of 0.25 mm. The wire was wound to form a helical line and the cylindrical helix was pressed flat through approximately 35° so that an elliptical cross-section was produced. The major axis measured 1.4 mm and the minor axis 0.9 mm. The helix was then isothermally recrystallized at 1,280° C. for 1 h. The flatter, diametrically opposite sides of this helix which had windings lying obliquely with respect to the longitudinal axis were now covered with a comparatively loose Pt layer by the paste process. For this purpose, the paste in the as-delivered state was diluted with organic solvent. The particle size of the Pt powder used was 5 $\mu$m max. The diluted paste was first dried at 350° C. and then converted to the metallic state by roasting at 1,000° C. under $O_2$ atmosphere for 24 h. In this process, a continuous layer 8 composed of electrically conducting $Cr_2O_3$ and a porous noble-metal surface layer 9 composed of a loose structure of sintered-together particles were formed. The layer 8 had a thickness of approximately 4 $\mu$m and the surface layer 9 one of approximately 30 $\mu$m.

The gas-impervious electrically conducting separating plate 4 was composed of a 0.30 mm thick bare sheet composed of an oxide-dispersion-hardened nickel-base alloy with the trade designation MA 754 (INCO) and having the following composition:
Cr = 20% by weight
Al = 0.3% by weight
Ti = 0.5% by weight
Fe = 1% by weight
C = 0.05% by weight
$Y_2O_3$ = 0.6% by weight
Ni = remainder This carrier material of the separating plate 4 was electrochemically provided on the fuel side with a 15 $\mu$m thick nickel plating 5. On the oxygen side, a noble-metal plating 6 in the form of a 4 $\mu$m thick Au layer was deposited in the same way by electroplating.

The carrier (basic body) 10 of the oxygen-side current collector was composed of a sinusoidally corrugated strip which had the following dimensions:
Thickness = 0.12 mm
Width = 2.2 mm
Corrugation length = 3.6 mm
Amplitude = 1.2 mm The material chosen was an oxide-dispersion-hardened nickel alloy with the trade name TD-Ni with the following composition:
$ThO_2$ = 2.0% by weight
Ni = remainder The carrier 10 of the current collector was punched out of fine-grained sheet produced by hot and cold rolling with intermediate annealing, pressed into corrugated form and isothermally recrystallized at 1,300° C. for 1 h. This resulted in the excellent hot strength with respect to bending transversely to the longitudinal direction. The carrier 10 was now first provided on both sides with a 3 $\mu$m thick Cr intermediate layer 11 by electroplating. Most of this intermediate layer was converted into the continuous layer 8 composed of electrically conductive $Cr_2O_3$ by roasting the whole in air at 800° C. for 24 h. The layer 8 which was produced in this way and was easily recognizable by its green color had a thickness of approximately 3 $\mu$m and was completely impervious. Now the crests of the corrugated oxygen-side current collector were provided with a porous noble-metal surface layer 12 at the contact/touching faces by the paste process in the same way as in the case of the fuel-side current collector. After heat treatment had been carried out in air, this layer had a thickness of approximately 40 $\mu$m. The porous noble-metal surface layer 12 was firmly anchored in the $Cr_2O_3$ layer 8.

At this point reference should specifically be made to the outstanding significance of the electrically conducting $Cr_2O_3$ layer 8 in connection with the series of layers according to the invention. The layer 8 has, inter alia, essentially 3 functions:

Protection of the carrier 10 made of dispersion-hardened high-temperature alloy (TD-Ni) against premature further oxidation.

Large-area low-resistance current transmission between carrier 10 and noble-metal surface layer 12.

Diffusion barrier preventing transfer of the noble metal into the carrier 10 (depletion of the surface layer 12) and preventing transfer of the carrier metals (Ni; Cr) into the noble metal (dilution and destruction of the surface layer 12 by reduction of the nonoxidizability).

With a current of approximately 40 mA per touching point, a voltage drop of approximately 2 mV was measured in the layer 8. This was equivalent to a resistance below the Pt coating point of approximately 50 m$\Omega$. At the touching point between the surface layer 12 having an area of approximately 1.2 mm$^2$ and a large-area Pt probe as counter electrode, a voltage drop of approximately 6 mV was measured, which was equivalent to a contact resistance of approximately 150 m$\Omega$. These voltage drops form only a few percent of the total cell voltage of a fuel cell.

Exemplary embodiment 2:
See FIG. 2.

The arrangement of current-transmitting elements comprised the following individual parts:
Current collector, fuel side
Separating plate
Current collector, oxygen side
The fuel cell per se comprised the same components 1, 2 and 3 as in Example 1.

The carrier (basic body) 7 of the fuel-side current collector comprised a series of comb-like, mutually offset contact fingers of approximately U-shaped longitudinal profile. The dimensions were as follows:
Total bent length: approx. 5.5 mm
Total height: approx. 1.8 mm
Width: approx. 1.5 mm
Thickness: approx. 0.15 mm The lateral gap between two contact fingers was 2 mm and the longitudinal one 2.5 mm. The residual lateral play between adjacent crossing contact fingers of two consecutive combs was accordingly 0.25 mm.

A number of current collectors according to carrier 7 (FIG. 2 above) were punched out of a 0.15 mm thick sheet and pressed into the specified double-comb shape.

The material chosen for the carrier 7 of the fuel-side current collector was an oxide-dispersion-hardened Ni alloy having the trade name TD-Ni. The composition was as follows:
$ThO_2$ = 2.0% by weight
Ni = remainder The starting material was composed of a fine-grained sheet which was produced by rolling and intermediate annealing and which, after punching and pressing, was converted to the desired form and isothermally recrystallized at 1,300° C. for 1 h. The carrier 7 was electrochemically provided on both sides with a 1 $\mu$m thick Cr intermediate layer 11. The coated carrier was then roasted for 10 h at 800° C. in air, in which process practically the entire Cr in this intermediate layer 11 was transferred from electrically conductive $Cr_2O_3$ into the continuous layer 8. The layer 8 had a thickness of approximately 1 μm and was completely impervious. Like the slightly convex base faces of the double-comb shaped fuel-side current collector, the heads were now electrochemically provided at the contact/touching faces with a continuous, more or less impervious noble-metal surface layer 13 composed of a plurality of layers. The total thickness of this surface layer 13 composed of Pd was approximately 20 μm. The noble-metal surface layer 13 adhered firmly to the $Cr_2O_3$ layer 8.

The gas-impervious, electrically conducting separating plate 4 was composed of a 0.35 mm thick bare sheet composed of an oxide-dispersion-hardened Ni/Cr alloy having the trade name TD-NiCr and the following composition:
Cr=20% by weight
$ThO_2$=2.0% by weight
Ni=remainder The carrier material of the separating plate 4 was electrochemically provided on the fuel side with a 30 μm thick nickel plating 5 and on the oxygen side with a noble-metal plating 6 in the form of a 6 μm thick Pd layer.

The carrier 10 of the oxygen-side current collector was composed of a sheet bent at right angles alternately towards the electrode 2 and towards the separating plate 4 and having corresponding projecting contact-finger-like lugs. The dimensions were as follows:
Total bent length: approx. 8 mm
Total height: approx. 3 mm
Width: approx. 2.0 mm
Thickness: approx. 0.25 mm The lateral gap between two contact-finger-like lugs was 2.6 mm and the longitudinal one 5 mm. The residual lateral play between adjacent mutually nested lugs was accordingly 0.3 mm.

The current collectors (carrier 10 as in FIG. 2, bottom) were punched out of a 0.25 mm thick sheet and pressed into the desired shape.

The chosen material for the carrier 10 of the oxygen-side current collector was an oxide-dispersion-hardened Ni-Cr alloy having the trade name TD-NiCr. The composition was as follows:
Cr=20% by weight
$ThO_2$2.0% by weight
Ni=remainder As starting material, use was made of a sheet which had a fine-grained crystal structure and which was converted by punching and pressing to the said shape. Then the whole was isothermally recrystallized at 1,280° C. for 1 h. The current collector was now subjected to an oxidizing atmosphere for 10 h at 800° C., in which process an approximately 2 μm thick continuous layer 8 of electrically conductive $Cr_2O_3$ was formed. The heads of the contact-finger-like lugs of the oxygen-side current collector were provided by using the electrochemical method with a continuous, more or less impervious noble-metal surface layer 14 at the contact/touching faces. For this purpose, Pd was used. The surface layer 13 had a thickness of approximately 25 μm and adhered completely to the layer 8 of electrically conductive $Cr_2O_3$.

With a current of approximately 80 mA per touching point, a voltage drop of approximately 3.6 mV was measured in the layer 8. This was equivalent to a resistance below the Pd coating point of approximately 45 mΩ. At the touching point between the surface layer 14 which had an area of approximately 0.6 mm² and a large-area Pt probe as counterelectrode, a voltage drop of approximately 8 mV was measured, which was equivalent to a contact resistance of approximately 100 mΩ. These voltage drops formed only a few percent of the total cell voltage of a fuel cell.

The invention is not limited to the exemplary embodiments.

The current-transmitting components for conducting current between adjacent shallow, planar, stacked ceramic high-temperature fuel cells containing solid electrolyte 1 based on doped stabilized zirconium oxide, the oxygen electrode 2 of one fuel cell being electrically conductively connected in each case to the fuel electrode 3 of the subsequent fuel cell and the gap between the electrodes 2; 3 being subdivided by a gas-impervious electrically conducting separating plate 4 into two chambers conducting the different gaseous media comprising fuel ($CH_4$) and oxygen ($O_2$) carrier generally comprise a separating plate 4 composed of an oxide-dispersion-hardened nickel/chromium alloy carrying a nickel plating 5 on the fuel side and a noble-metal plating on the oxygen side, in addition, current collectors arranged both on the fuel side and on the oxygen side, each current collector comprising in its turn a carrier 7; 10 which determines the geometrical shape and is composed of an electrically conducting oxide-dispersion-hardened nickel or nickel/chromium alloy having a high Cr content at least in the surface zones, $ThO_2$ being present as dispersoid in a content of up to 2% by weight, furthermore of a porous or impervious noble-metal surface layer 9; 12; 13; 14 which is present only at the contact/touching faces and is made of Au or a Pt metal or an alloy of at least two of said metals, and of a continuous layer 8 which is present between carrier 7; 10 and noble metal surface layer 9; 12; 13; 14 and is made of electrically conductive $Cr_2O_3$ which simultaneously acts as an oxidation protection and as a diffusion barrier.

In a first variant, the noble-metal surface layer 13; 14 is present at the contact/touching faces in a completely continuous and impervious form in a thickness of 5 to 100 μm and the $Cr_2O_3$ layer 8 underneath in a thickness of 1 to 20 μm.

In a second variant, the noble-metal surface layer 9; 12 is present at the contact/touching faces in a partially continuous and porous form in a thickness of 5 to 150 μm and the $Cr_2O_3$ layer 8 underneath in a thickness of 1 to 20 μm.

A current-transmitting component is furthermore constructed as separating plate 4 or as current collector, the latter having the form of a contact finger or of a corrugated strip or wire or of a wire helix or of a woven metal fabric or of a fleece and only the points and projections situated nearest the electrodes 2; 3 and/or the separating plate 4 being provided with a noble-metal surface layer 9; 12; 13; 14.

The method of producing a current-transmitting component is carried out by first manufacturing a carrier 7; 10 from the oxide-dispersion-hardened nickel or nickel/chromium alloy by thermo-mechanical treatment and/or mechanical machining from suitable fine-grained input material/semi-finished product in the form of sheet, strip or wire and recrystallizing it under protective gas or vacuum at 1,250° to 1,320° C. for ½ h to 3 h to produce a heat-resistant coarse-grained structure and, if nickel is used, electrochemically providing it with an intermediate Cr layer 11 0.5 to 10 μm thick, roasting in oxygen atmosphere at 800° to 900° C. for 1 to 24 h to form a continuous layer 8 of electrically conductive $Cr_2O_3$ and by providing the carrier 7; 10 coated in this way with a noble-metal surface layer 9; 12; 13; 14 at the contact/touching faces to the electrodes 2; 3 and to the separating plate 4.

A first form of carrying out the method is one wherein, to deposit a porous noble-metal surface layer 9; 12, the carrier 7; 10 is superficially coated at the contact/touching faces with a paste or suspension of noble-metal powder in binder and solvent by brushing, spreading, rolling an impregnated felt or partial immersion and the whole is dried and subjected to a sintering process at 0.7–0.8 of the absolute melting point of the noble metal in inert atmosphere or vacuum and then roasted at 800° to 1,100° C. in oxidizing atmosphere for at least 24 h.

A second form of carrying out the method is one wherein, to deposit a continuous, more or less impervious noble-metal surface layer 13; 14, the carrier 7; 10 is superficially coated electrochemically at the contact/touching faces and the whole is dried and roasted at 800° to 1,100° C. in an oxidizing atmosphere for at least 24 h.

An essential advantage of these current-transmitting components for conducting current between adjacent fuel cells is that they can be used practically without substantial change or adaptation both on the oxygen side and on the fuel side of the actual electrochemical cell, that is to say are, in principle, capable of being used universally.

Obviously, numerous modifications and variations of the present invention are possible in the light of the above teachings. It is therefore to be understood that within the scope of the appended claims, the invention may be practiced otherwise than as specifically described herein.

What is claimed as new and desired to be secured by Letters Patent of the United States is:

1. Current-transmitting components for conducting current between adjacent shallow, planar, stacked ceramic high-temperature fuel cells containing solid electrolyte (1) based on doped stabilized zirconium oxide, the oxygen electrode (2) of one fuel cell being electrically conductively connected in each case to the fuel electrode (3) of the subsequent fuel cell and the gap between the electrodes (2; 3) being subdivided by a gas-impervious electrically conducting separating plate (4) into two chambers conducting the different gaseous media comprising fuel ($CH_4$) and oxygen ($O_2$) carrier, wherein a separating plate (4) composed of an oxide-dispersion-hardened nickel/chromium alloy carrying a nickel plating (5) on the fuel side and a noble-metal plating (6) on the oxygen side is provided, and wherein, furthermore, current collectors are provided both on the fuel side and on the oxygen side, each current collector comprising a carrier (7; 10) which determines the geometrical shape and is composed of electrically conducting oxide-dispersion-hardened nickel or nickel/chromium alloy having a high Cr content at least in the surface zones, $ThO_2$ being present as dispersoid in a content of up to 2% by weight, furthermore of a porous or impervious noble-metal surface layer (9; 12; 13; 14) which is present only at the contact/touching faces and is made of Au or a Pt metal or an alloy of at least two of said metals, and of a continuous layer (8) which is present between carrier (7; 10) and noble-metal surface layer (9; 12; 13; 14) and is made of electrically conductive $Cr_2O_3$ which simultaneously acts as an oxidation protection and as a diffusion barrier.

2. A current-transmitting component as claimed in claim 1, wherein the noble-metal surface layer (13; 14) is present at the contact/touching faces in a completely continuous and impervious form in a thickness of 5 to 100 $\mu$m and the $Cr_2O_3$ layer (8) underneath in a thickness of 1 to 20 $\mu$m.

3. A current-transmitting component as claimed in claim 1, wherein the noble-metal surface layer (9; 12) is present at the contact/touching faces in a partially continuous and porous form in a thickness of 5 to 150 $\mu$m and the $Cr_2O_3$ layer (8) underneath in a thickness of 1 to 20 $\mu$m.

4. A current-transmitting component as claimed in claim 1, wherein it is constructed as separating plate (4) or wherein it is constructed as current collector and has the form of a contact finger or of a corrugated strip or wire or of a wire helix or of a woven metal fabric or of a fleece, and wherein only the points and projections situated nearest the electrodes (2; 3) and/or the separating plate (4) are provided with a noble-metal surface layer (9; 12; 13; 14).

5. A method of producing a current-transmitting component as claimed in claim 1 which comprises first manufacturing a carrier (7; 10) from the oxide-dispersion-hardened nickel or nickel/chromium alloy by thermo-mechanical treatment and/or mechanical machining from suitable fine-grained input material (semi-finished product in the form of sheet, strip or wire and recrystallizing it under protective gas or vacuum at 1,250° to 1,320° C. for ½ h to 3 h to produce a heat-resistant coarse-grained structure and, if nickel is used, electrochemically providing it with an intermediate Cr layer (11) 0.5 to 10 $\mu$m thick, roasting in oxygen atmosphere at 800° to 900° C. for 1 to 24 h to form a continuous layer (8) of electrically conductive $Cr_2O_3$, and which comprises providing the carrier (7; 10) coated in this way with a noble-metal surface layer (9; 12; 13; 14) at the contact/touching faces to the electrodes (2; 3) and to the separating plate (4).

6. The method as claimed in claim 5, wherein, to deposit a porous noble-metal surface layer (9; 12), the carrier (7; 10) is superficially coated at the contact/touching faces with a paste or suspension of noble-metal powder in binder and solvent by brushing, spreading, rolling an impregnated felt or partial immersion and the whole is dried and subjected to a sintering process at 0.7–0.8 of the absolute melting point of the noble metal in inert atmosphere or vacuum and then roasted at 800° to 1,100° C. in oxidizing atmosphere for at least 24 h.

7. The method as claimed in claim 5, wherein, to deposit a continuous, more or less impervious noble-metal surface layer (13; 14), the carrier (7; 10) is superficially coated electrochemically at the contact/touching faces and the whole is dried and roasted at 800° to 1,100° C. in oxidizing atmosphere for at least 24 h.

* * * * *